(12) United States Patent
De Ruijter (10) Patent No.: US 8,837,646 B2
(45) Date of Patent: Sep. 16, 2014

(54) RECEIVER HAVING A SCALABLE INTERMEDIATE FREQUENCY

(75) Inventor: Hendricus De Ruijter, Sunnyvale, CA (US)

(73) Assignee: Silicon Laboratories Inc., Austin, TX (US)

( * ) Notice: Subject to any disclaimer, the term of this patent is extended or adjusted under 35 U.S.C. 154(b) by 281 days.

(21) Appl. No.: 13/244,590

(22) Filed: Sep. 25, 2011

(65) Prior Publication Data

US 2013/0077715 A1 Mar. 28, 2013

(51) Int. Cl.
*H04L 27/06* (2006.01)
*H04B 1/00* (2006.01)
*H04L 27/00* (2006.01)

(52) U.S. Cl.
CPC ............ *H04B 1/001* (2013.01); *H04L 27/0002* (2013.01); *H04B 1/0021* (2013.01)
USPC ......................................................... 375/344

(58) Field of Classification Search
CPC ..... H04B 1/001; H04B 1/021; H04B 27/0002
USPC ......................................................... 375/344
See application file for complete search history.

(56) References Cited

U.S. PATENT DOCUMENTS

| 4,045,740 | A | * | 8/1977 | Baker ........................... 455/266 |
| 5,570,392 | A | * | 10/1996 | Young et al. ................... 375/308 |
| 5,579,341 | A | * | 11/1996 | Smith et al. .................... 375/267 |
| 5,669,067 | A | * | 9/1997 | Mambo ........................... 455/76 |
| 6,058,148 | A | * | 5/2000 | Whikehart et al. ............ 375/350 |
| 2003/0087613 | A1 | * | 5/2003 | Bellaouar et al. ................ 455/91 |
| 2005/0079838 | A1 | * | 4/2005 | Li et al. ........................... 455/142 |
| 2005/0239428 | A1 | * | 10/2005 | Seendripu et al. ............ 455/280 |
| 2005/0265483 | A1 | * | 12/2005 | Erdogan ........................ 375/316 |
| 2010/0104055 | A1 | * | 4/2010 | Jeong et al. .................... 375/355 |
| 2010/0328544 | A1 | * | 12/2010 | Hendrickson et al. ........ 348/726 |
| 2011/0086606 | A1 | * | 4/2011 | Chen et al. ..................... 455/323 |
| 2011/0171919 | A1 | * | 7/2011 | Tryhub et al. .............. 455/193.1 |

* cited by examiner

*Primary Examiner* — Juan A Torres (74) *Attorney, Agent, or Firm* — Trop, Pruner & Hu, P.C.

(57) ABSTRACT

A technique includes using a receiver to process a radio frequency (RF) signal to downconvert spectral content from a first frequency band to a second frequency band to generate an intermediate frequency (IF) signal. The technique includes controlling a location of the second frequency band based at least in part on a selectable channel bandwidth of the receiver.

18 Claims, 6 Drawing Sheets

RECEIVER HAVING A SCALABLE INTERMEDIATE FREQUENCY

BACKGROUND

For purposes of wirelessly communicating data, a radio frequency (RF) carrier signal may be modulated with the data to produce an RF signal to drive an antenna. One type of modulation is angle modulation, which involves modulating the angle of the carrier signal. The angle modulation may involve modulating the frequency of the radio frequency (RF) carrier signal (called "frequency modulation (FM)") or modulating the phase of the carrier signal (called "phase modulation (PM)").

An angle modulation receiver may contain a mixer that downconverts the spectral content in a selected RF band of a received RF signal to a lower intermediate frequency (IF) band that is more suitable for processing by the receiver. The receiver processes the IF frequency to obtain the information originally modulated onto the RF signal.

SUMMARY

In an embodiment, a technique includes using a receiver to process a radio frequency (RF) signal to downconvert spectral content from a first frequency band to a second frequency band to generate an intermediate frequency (IF) signal. The technique includes controlling a location of the second frequency band based at least in part on a selectable channel bandwidth of the receiver.

In another embodiment, a receiver includes a downconverter, an interface and a controller. The downconverter adapted to process a radio frequency (RF) signal to downconvert spectral content from a first frequency band to a second frequency band to generate an intermediate frequency (IF) signal. The interface is programmable to select a channel bandwidth for the receiver. The controller is coupled to the interface to control a location of the second frequency band based at least in part on the selected channel bandwidth.

In yet another embodiment, an apparatus includes an integrated circuit that includes a downconverter, an interface, a filter and a controller. The downconverter is adapted to process an intermediate frequency (IF) to downconvert spectral content from a first frequency band to a second frequency band to generate a baseband signal. The interface is adapted to be programmed to select a channel bandwidth for the filter, and the controller controls a location of the first frequency band based at least in part on the selected channel bandwidth.

Advantages and other features of the disclosed concepts will become apparent from the following drawing, description and claims.

DETAILED DESCRIPTION

Figure 1:
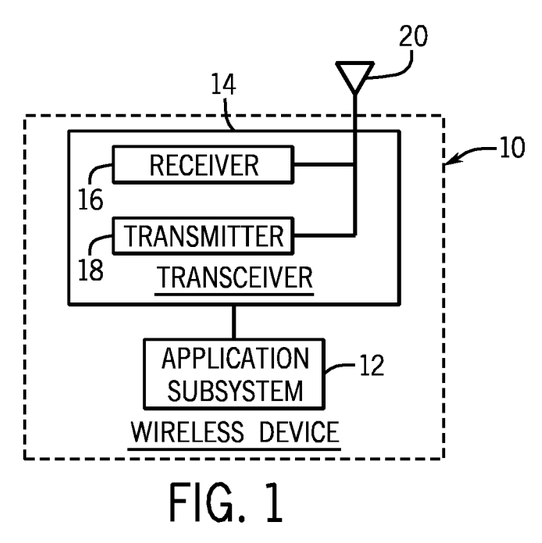
FIG. 1 is a schematic diagram of a wireless device according to an exemplary embodiment.

Referring to FIG. 1, a wireless device 10 may be used in a number of different applications for purposes of communicating data over a wireless link using radio frequency (RF) signals. As non-limiting examples, the wireless device 10 may be a personal computer (PC) peripheral; a wireless toy; a remote keyless entry; an industrial control; a home automation controller, sensor or slave device; a sensor network; etc. In general, the wireless device 10 includes an application subsystem 12, which tailors the wireless device 10 for its specific application and may, for example, form a user interface for the device 10. In general, the application subsystem 12 performs various application processing tasks relating to the application in which the wireless device 10 is employed, and these tasks may involve communicating data to a transceiver 14 of the wireless device 10 to be transmitted over a wireless link and receiving data from the transceiver 14, which was received from the wireless link. It is noted that in other exemplary embodiments, the wireless device 10 may only transmit data and not include a receiver. Thus, many variations are contemplated and are within the scope of the appended claims.

The transceiver 14 for the exemplary embodiment depicted in FIG. 1 includes a transmitter 18 that is coupled to an antenna 20 for purposes of transmitting data over the wireless link. In this manner, the transmitter 18 modulates a carrier signal with data to be transmitted and provides the resulted modulated carrier signal to the antenna 20, which radiates electromagnetic energy in response to the signal to transmit the data over the wireless link. The transceiver 14 for the embodiment depicted in FIG. 1 also includes a receiver 16, which is coupled to the antenna 20 for purposes of receiving a modulated carrier signal that is indicative of data that is received from the wireless link. The receiver 16 demodulates the modulated carrier signal to recover the transmitted data and provides this data to the application subsystem 12.

In accordance with other exemplary embodiments, the receiver 16 and the transmitter 18 may be coupled to separate antennas of the wireless device 10. Moreover, in accordance with some exemplary embodiments, the wireless device 10 may include multiple antennas 20 that the wireless device 10 selectively couples to the transmitter 18, depending on one of multiple transmission frequency bands that may be selected for the communication over the wireless link. In a similar manner, in accordance with some exemplary embodiments, the wireless device 10 may include multiple antennas 20 that the wireless device 10 selectively couples to the receiver 16, depending on one of multiple transmission frequency bands that may be selected for communication over the wireless link.

In accordance with some exemplary embodiments, the receiver 16 includes various components, which may be part of the same integrated circuit 160 (see FIG. 2), which may be fabricated in the same or on separate dies of the same semiconductor package, for example. In some exemplary embodiments, the entire receiver 16 may be fabricated on a single die and as such, may be part of a single integrated circuit, multi chip module (MCM), etc.

Figure 2:
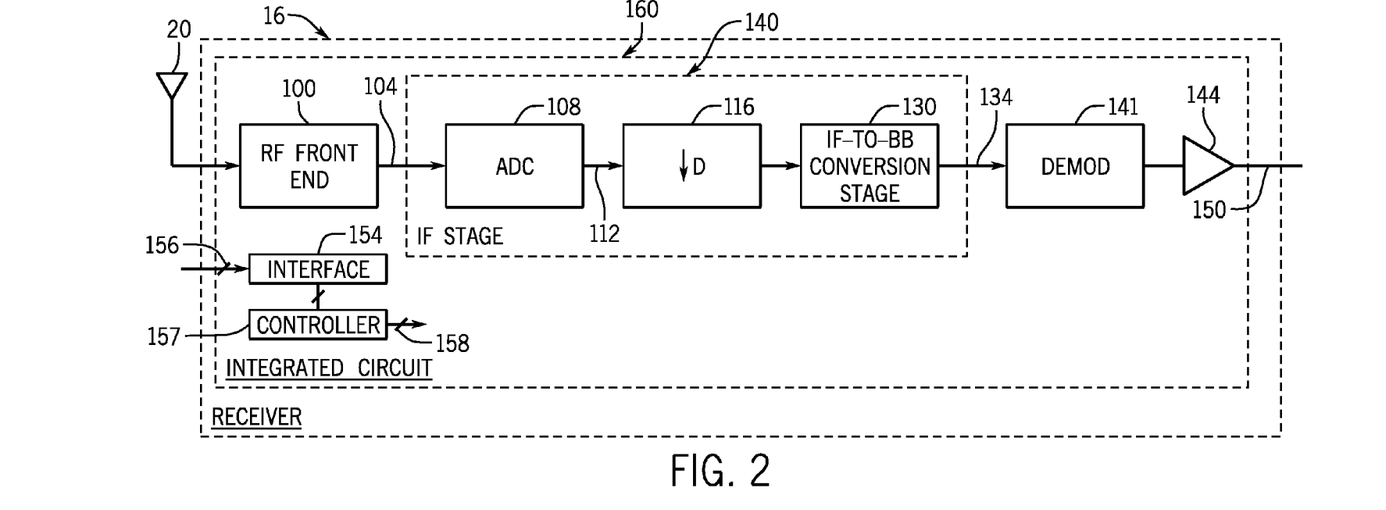
FIG. 2 is a schematic diagram of a receiver of the wireless device of FIG. 1 according to an exemplary embodiment.

Referring to FIG. 2, in accordance with exemplary embodiments disclosed herein, the receiver 16 employs a low intermediate frequency (IF) architecture in that the receiver 16 converts a received RF signal to an IF signal and then further downconverts the IF signal to a baseband (BB) signal, which is demodulated by the receiver 16 to produce, for example, a data signal, audio signal, etc., on one or more output terminals 150 of the receiver 16. In accordance with non-limiting exemplary embodiments disclosed herein, the BB signal is a zero frequency BB signal, which means that the spectral content of the BB signal is centered at zero frequency, or DC.

In general, an RF signal is received on the antenna 20 and processed by an RF front end 100 of the receiver 16. As a non-limiting example, the RF front end 100 may be an analog circuit, which contains an analog complex mixer to downconvert the spectral content from a selected RF frequency band to an IF band. The RF front end 100 furnishes the resulting analog IF signal to an input terminal 104 of an IF stage 140 of the receiver 16. The IF stage 140, for this example, is a digital stage, which further downconverts the spectral content from the IF band to form a zero frequency BB digital signal that appears on an output terminal 134 of the stage 140 and is furnished to a demodulator 141. As depicted in FIG. 2, the IF stage 140 includes an analog-to-digital converter (ADC) 108, which receives the analog IF signal from the input terminal 104 and furnishes a corresponding digital IF signal on one or more output terminals 112 of the ADC 108.

The digital IF signal that is provided by the ADC 108 may be decimated by a decimator 116, which effectively removes samples of the digital IF signal to produce a downsampled signal that is provided to an IF-to-BB conversion stage 130. The IF-to-BB conversion stage 130 performs a complex downconversion of the decimated, digital IF signal to produce the zero frequency BB signal that is provided to the demodulator 141. The demodulator 141 demodulates the BB signal to produce a content signal that may be further amplified or attenuated by one or more amplifiers 144 of the receiver 16 before appearing on the output terminal(s) 150 of the receiver 16.

In accordance with exemplary embodiments disclosed herein, the receiver 16 has a selectable channel bandwidth. In this regard, in accordance with example embodiments, the receiver 16 includes a programmable interface 154 (accessible via one or more external terminals 156, for example), which allows the selection of a particular channel bandwidth from a range of possible channel bandwidths for the receiver 16. In this regard, the interface 154 may be programmed via one or more write operations on a control bus, programmed using external signals, etc. Regardless of the manner in which the interface 154 is programmed, the channel bandwidths available for the receiver 16 may span a relatively wide range from (as a non-limiting example) about 10 kilohertz (kHz) to about 800 kHz. This relatively large bandwidth range permits the receiver 16 to be used in a relatively large number of different wireless applications. A controller 157 of the receiver 16 generates one or more signals (on its output terminals 158) to control the receiver 16 for purposes of configuring the receiver 16 for the selected channel bandwidth, as further disclosed herein.

Figure 3:
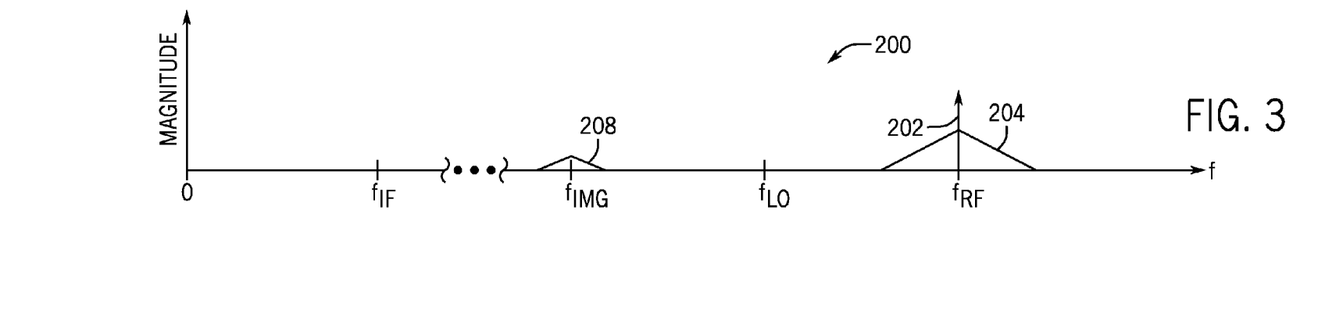
FIG. 3 illustrates an exemplary spectrum of a radio frequency (RF) signal before downconversion according to an exemplary embodiment.

FIG. 3 depicts an exemplary spectrum 200 for the RF signal before the RF signal is downconverted. As shown in FIG. 3, for this example, the tuned-in, or selected, RF band is disposed at a frequency $f_{RF}$ and contains spectral content 204 pertaining to the data or content to be recovered in the RF band as well as spectral energy 202 that corresponds to the carrier. The goal of the RF-to-IF downconversion is to frequency translate the spectral content 204 to the IF band, which is centered at an intermediate frequency called "$f_{IF}$" in FIG. 3. For this purpose, complex quadrature signals, e.g., in-phase (I) and quadrature (Q) signals (each having a fundamental frequency called "$f_{LO}$") are multiplied or mixed with the RF signal to produce sum and difference beat frequencies. One of these beat frequencies corresponds to the $f_{IF}$ intermediate frequency and results in the frequency translation of the spectral content 204 to the IF band. However, the spectral content 208 in a frequency band other than the selected RF band is also translated to the IF band as a result of this downconversion. The spectral content 208 in this other frequency band, called the "image," is centered at an image frequency (called "$f_{IMG}$" in FIG. 3). As depicted in FIG. 3, the $f_{IMG}$ image frequency is on one side of the $f_{LO}$ frequency, with the $f_{RF}$ frequency being disposed on the other side of the $f_{LO}$ frequency. Because the image is also downconverted to the IF band, out-of-band spectral energy may potentially be downconverted to the IF band.

Although measures may be undertaken for purposes of suppressing the image, the suppression may not be sufficient to limit the receiver's ability to suppress interfering signals. In accordance with embodiments disclosed herein, the receiver 16 positions the image near the selected RF band so that any spectral energy attributable to the image is close to the selected band. It is noted that the close by selectivity specifications of the receiver 16 may be generally much more relaxed than the far away blocking specifications of the receiver 16.

Figure 4:
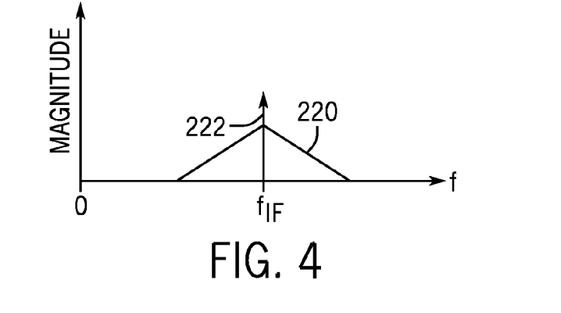
FIG. 4 is an illustration of an exemplary spectrum of an intermediate frequency (IF) signal according to an exemplary embodiment.
Figure 5:
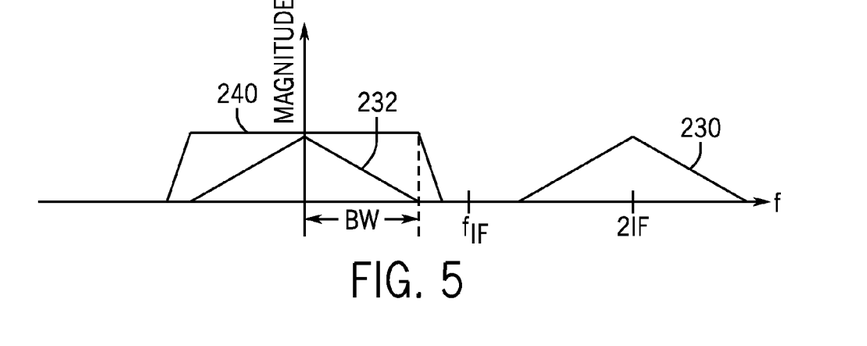
FIG. 5 is an illustration of an exemplary spectrum of a downconverted baseband (BB) signal before filtering according to an exemplary embodiment.

The frequency dependency of the image with respect to the $f_{IF}$ intermediate frequency is generally illustrated in FIGS. 4 and 5 in which spectral energy 220 centered at the $f_{IF}$ intermediate frequency 222 (FIG. 4) has been frequency translated to a zero BB frequency (FIG. 5) to produce spectral content 232 centered at zero frequency. As illustrated in FIG. 5, a low pass filter 240 having a bandwidth BW may be used to filter out other spectral content (such as content 230) that is present due to the downconversion. As can be seen from FIG. 5, for a constant, or fixed, $f_{IF}$ intermediate frequency, the bandwidth BW of the filter 240 generally sets a limit on how low the $f_{IF}$ intermediate frequency may be. Therefore, to accommodate a wide range of channel bandwidths, the $f_{IF}$ intermediate frequency for a fixed IF receiver 16 may be set to a higher frequency to accommodate the selection of one of the larger channel bandwidths. However, for smaller bandwidths, a smaller $f_{IF}$ intermediate frequency is desirable for purposes of pushing the image near the selected RF channel.

Figure 6:
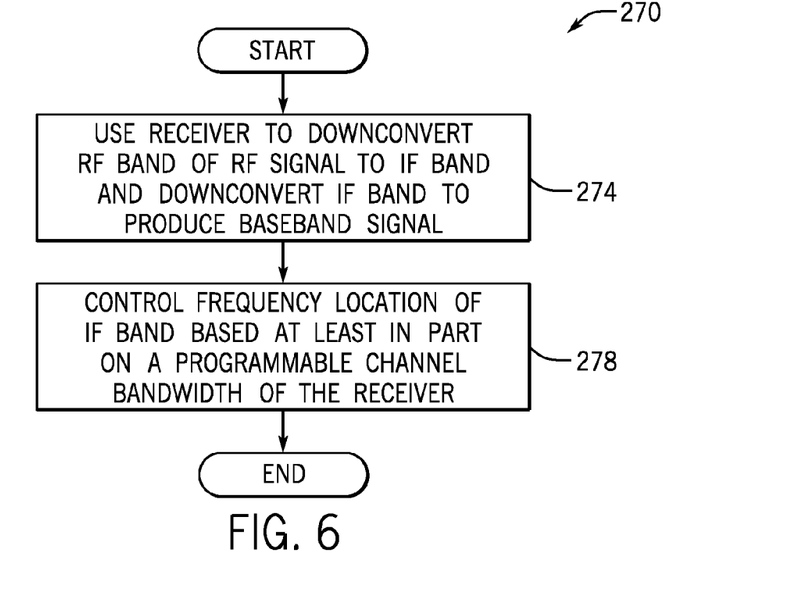
FIG. 6 is a flow chart depicting a technique to control a location of an IF band based on a selectable channel bandwidth for the receiver according to an exemplary embodiment.

In accordance with embodiments disclosed herein, the receiver 16 is programmable, or configurable, to be either a fixed IF receiver or a variable IF receiver. When configured to be a variable IF receiver, the receiver 16 has a scalable $f_{IF}$ intermediate frequency, which is proportionally scaled with respect to the channel bandwidth. More specifically, referring to FIG. 6, in accordance with embodiments disclosed herein, a technique 270 includes using (block 274) a receiver to downconvert spectral content from an RF band of an RF signal to an IF band and then downconvert spectral content from the IF band to produce a baseband signal; and controlling (block 278) the frequency location of the IF band based at least in part on a programmable channel bandwidth of the receiver.

Figure 7:
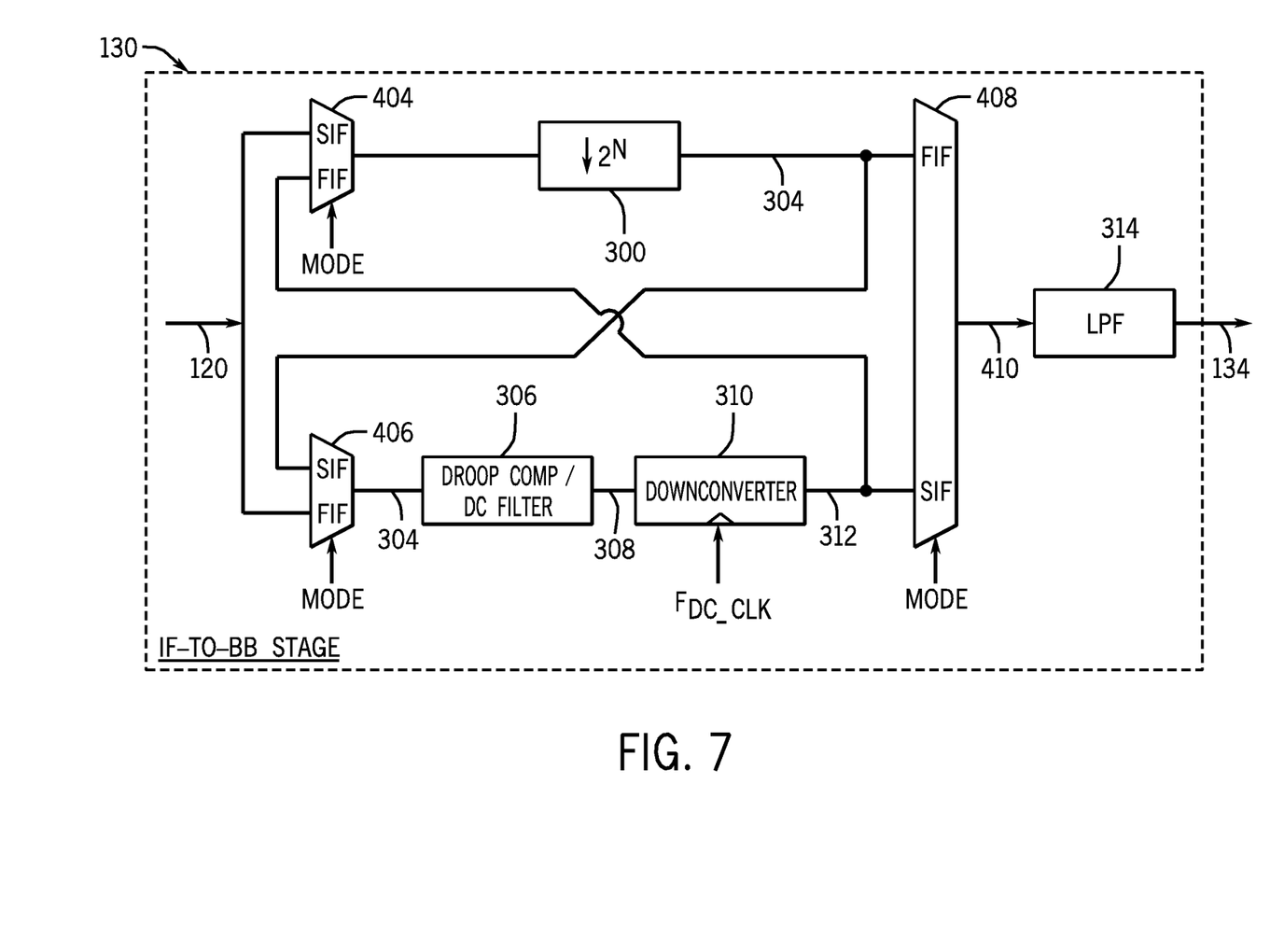
FIG. 7 is a schematic diagram of an IF-to-BB conversion stage of the receiver of FIG. 2 according to an exemplary embodiment.

FIG. 7 depicts the IF-to-BB conversion stage 130 in a particular embodiment that allows either a scalable IF band or a fixed IF band for the receiver 16. The selection of either a scalable IF mode or a fixed IF mode for the receiver 16 is controlled through multiplexers 404, 406 and 408. In this manner, bits of a configuration register (not shown) of the receiver 16 may be used to control whether the multiplexers 404, 406 and 408 process signals received at their SIF terminals (corresponding to the scalable IF mode) or FIF terminals (corresponding to the fixed IF mode). In general, the multiplexers 404, 406 and 408 control whether a decimator 300 is positioned before or after a complex downconverter 310 of the stage 130. The scalable IF mode for the stage 130 is depicted in FIG. 8.

Figure 8:
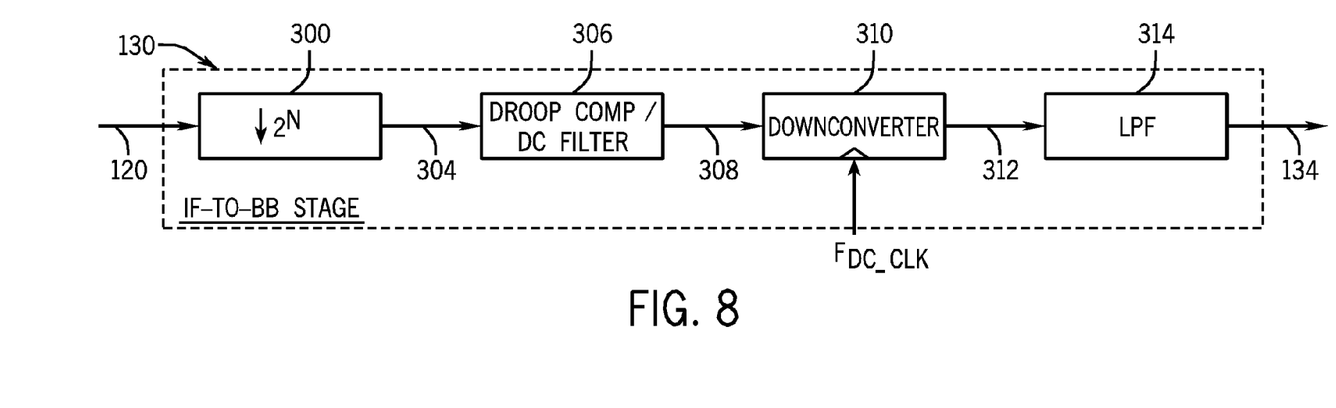
FIG. 8 is an illustration of the IF-to-BB conversion stage of FIG. 7 when configured to be in a scalable IF mode according to an exemplary embodiment.

Referring to FIG. 8, for the scalable IF mode, the decimator 300 receives the signal from the decimator 116 (see FIG. 2) and further decimates the signal by a decimation rate of "$2^N$." It is noted that other decimation rates may be used, in accordance with other embodiments. In other words, the decimator 300 further removes $2^N$ samples from the incoming digital signal. This decimation, in turn, inversely reduces the channel bandwidth, as the downsampling lowers the number of samples processed by a downstream low pass filter 314 (a finite impulse response (FIR) filter, for example). Thus, the controller 157 (see FIG. 2) via its output terminals 158 provides a value for N based on the channel bandwidth that is programmed into the interface 154 (see FIG. 2). As described below, this value of N, in general, controls the channel bandwidth of the receiver 16 and the location of the IF band. The output signal that is provided by the decimator 300 is furnished to an input terminal 304 of a droop compensation/DC filter 306 of the stage 130. The resulting processed signal is furnished at an input terminal 308 of a complex digital downconverter 310.

The downconverter 310 is clocked by a clock signal called "$F_{DC\text{-}CLK}$." In general, the $F_{DC\text{-}CLK}$ clock signal may be described as follows:

$$F_{DC-CLK} = \frac{F_S}{D \cdot 2^N}, \qquad \text{Eq. 1}$$

where "$F_S$" represents the sample rate of the ADC 108 (see FIG. 2); "D" represents the decimation rate applied by the decimator 116 (see FIG. 2); and "$2^N$" represents the decimation rate applied by the decimator 300. It is noted that the $F_{DC\text{-}CLK}$ clock signal may be provided by a numerically controlled oscillator (NCO) (not shown in FIG. 8). For purposes of minimizing power consumption, the $F_{DC\text{-}CLK}$ clock signal is an integer multiple of the $F_{IF}$ frequency, as set described below:

$$IF = \frac{F_S}{D \cdot OSR \cdot 2^N}, \qquad \text{Eq. 2}$$

where "OSR" is described below:

$$OSR = \frac{F_{DC-CLK}}{f_{IF}}. \qquad \text{Eq. 3}$$

The NCO synthesizes digital sine and cosine signals with the $f_{IF}$ frequency to produce corresponding I and Q quadrature mixing signals. The downconverter 310 multiples these mixing signals with the digital IF signal to frequency translate, or shift, the IF spectrum to baseband to produce the zero frequency BB signal at the input terminal 312 of the low pass filter 314.

The $2^N$ decimation rate controls the sample rate in the filter 314 to therefore scale the channel bandwidth with the $2^N$ decimation rate. Because the $f_{IF}$ intermediate frequency is inversely proportional to the $2^N$ decimation rate, as set forth by Eq. 2, the frequency location of $f_{IF}$ frequency and thus, the frequency location of the IF band is scalable with the channel bandwidth. In other words, the frequency location of the IF band varies directly with the channel bandwidth such that a given change in the channel bandwidth corresponds to a proportionate change in the frequency location of the IF band. Therefore, the receiver 16 positions the image near the related RF band, regardless of the selected channel bandwidth.

Figure 10:
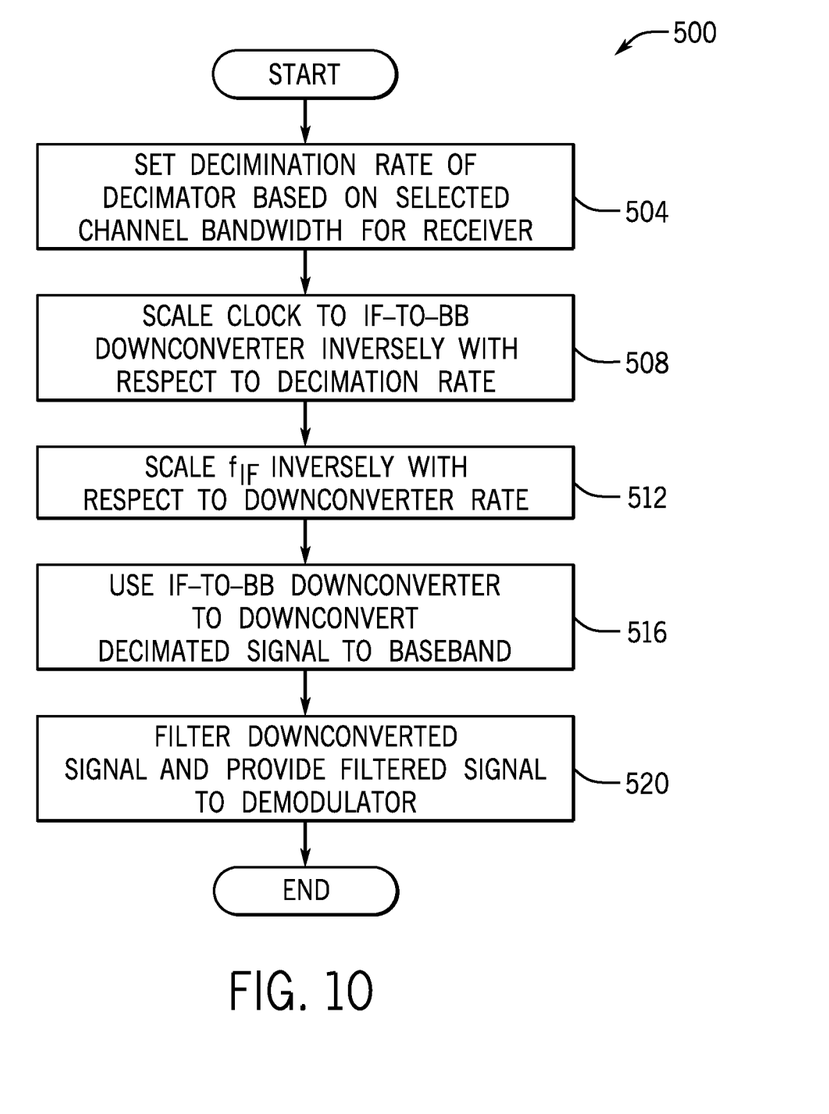
FIG. 10 is a flow diagram depicting a technique to scale the location of an IF band based on a selected channel bandwidth according to an exemplary embodiment.

Thus, referring to FIG. 10, in accordance with example embodiments, a technique 500 includes setting (block 504) a decimation rate of a decimator based on a selected channel bandwidth for a receiver and a scaling (block 508) a clock of an IF-to-BB downconverter inversely with respect to the decimation rate. The technique 500 also includes scaling (block 512) the $f_{if}$ frequency inversely with respect to the decimation rate. Pursuant to the technique 500, the IF-to-BB downconverter is used to downconvert the decimated signal to baseband, pursuant to block 516, and filter (block 520) the downconverted signal and provide the filtered signal to a demodulator.

Figure 9:
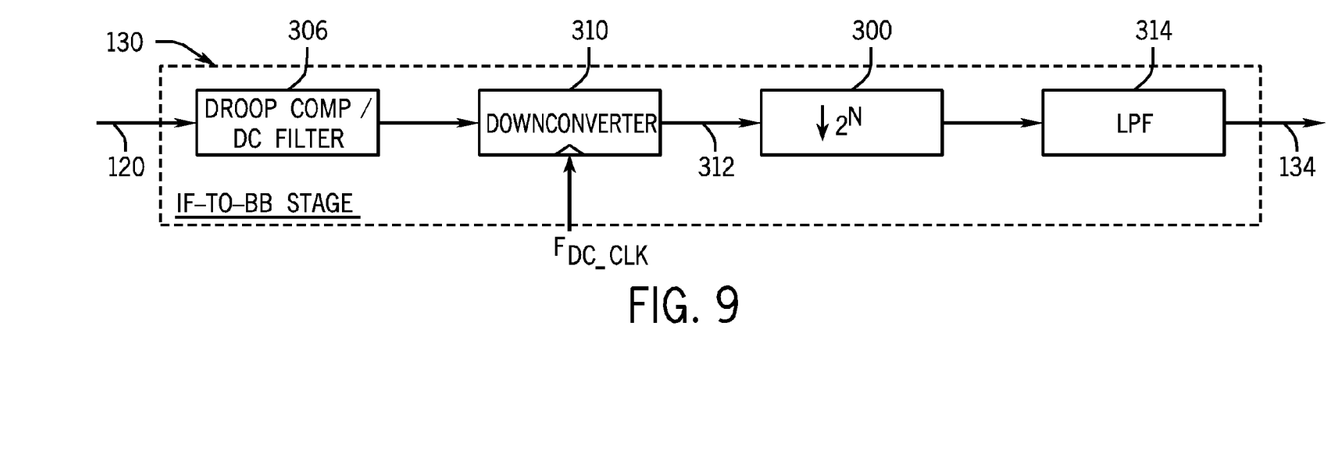
FIG. 9 is a schematic diagram illustrating the IF-to-BB conversion stage of FIG. 7 when configured to be in a fixed IF mode according to an exemplary embodiment.

FIG. 9 depicts the IF-to-BB conversion stage 130 when configured to be in the fixed IF mode. For this configuration, the decimator 300 is disposed downstream of the downconverter 310. Moreover, for this configuration, the $F_{DC\text{-}CLK}$ clock signal and the $f_{IF}$ intermediate frequency are described as follows:

$$F_{DC-CLK} = \frac{F_S}{D}, \text{ and} \qquad \text{Eq. 4}$$

$$f_{IF} = \frac{F_S}{D \cdot OSR}. \qquad \text{Eq. 5}$$

As can be seen from Eqs. 4 and 5, unlike the scalable IF mode, for the fixed IF mode, the $F_{DC\text{-}CLK}$ clock signal and the $f_{IF}$ intermediate frequency do not vary with the channel bandwidth.

Other embodiments are contemplated and are within the scope of the appended claims. For example, in accordance with some embodiments, although the frequency location of the IF band may generally vary with the selected channel bandwidth, the frequency location may not vary directly, or scale proportionally, with the selected channel bandwidth. For example, in accordance with some embodiments, in response to the selected channel bandwidth, the receiver may set the above-described N decimation parameter (resulting in a proportionate IF band frequency location, as described above) and may also further control the filter coefficients of the filter 314 to control the channel bandwidth independently from the location of the IF band. For example, the receiver may decimate the digital IF signal by an additional decimation rate (0, 2, 3, 4, 6, 8, 12, etc.) that is independent from the location of the IF band for purposes allowing a finer resolution adjustment to the channel bandwidth. Thus, the selected channel bandwidth may, in accordance with some embodiments, be achieved by controlling two sets of parameters: a decimation rate ($2^N$, for example) that changes both the location of the IF band directly and the channel bandwidth; and filtering coefficients of the filter 314, which change only the channel bandwidth. As a non-limiting example, the controller 157 (see FIG. 2) may determine the N value and the filter coefficients of the filter 314 and control the decimator 300 and the filter 314 accordingly.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
   using a receiver to process a radio frequency (RF) signal to downconvert a spectral content from a first frequency band to a second frequency band to generate an intermediate frequency (IF) signal;
   controlling a location of the second frequency band based at least in part on a selectable channel bandwidth of the receiver;
   converting the IF signal to a digital IF signal;
   decimating the digital IF signal to provide a decimated digital IF signal;
   downconverting the decimated digital IF signal to provide a baseband signal;
   filtering the baseband signal using a digital channel filter;
   controlling a rate of the decimation to control the bandwidth, wherein the act of controlling the rate of the decimation comprises controlling a decimation rate to control the location of the second frequency band and the bandwidth; and
   controlling filter coefficients of the digital channel filter to control the bandwidth independently from the location of the second frequency band.

2. The method of claim 1, wherein using the receiver to downconvert comprises using a mixer of the receiver to generate the IF signal in response to the RF signal and quadrature mixing signals, each of the quadrature signals have a fundamental frequency associated with the first frequency band.

3. The method of claim 1, wherein the first frequency band comprises an RF band and the second frequency band comprises an IF band.

4. The method of claim 1, further comprising using the receiver to process the IF signal to downconvert spectral content from the IF band to generate a baseband signal.

5. The method of claim 1, further comprising using an analog mixer of the receiver to downconvert the spectral content from the first frequency band to the second frequency band.

6. The method of claim 1, further comprising:
   controlling a frequency of a downconverter of the receiver based at least in part on the decimation rate.

7. The method of claim 1, wherein the controlling comprises controlling the frequency location such that a change in the selectable channel bandwidth produces a proportionate change in the frequency location.

8. The method of claim 4, wherein the using the receiver to process the IF signal comprises using a digital downconverter.

9. A receiver comprising:
   a downconverter adapted to process a radio frequency (RF) signal to downconvert a spectral content from a first frequency band of to a second frequency band to generate an intermediate frequency (IF) signal;
   an interface circuit programmable to select a channel bandwidth for the receiver; and
   a controller coupled to the interface circuit to:
      convert the IF signal to a digital IF signal;
      decimate the digital IF signal to provide a decimated digital IF signal;
      downconvert the decimated digital IF signal to provide a baseband signal;
      filter the baseband signal using a digital channel filter;
      control a location of the second frequency band based at least in part on the selected channel bandwidth, wherein the controller controls the rate of the decimation by controlling a decimation rate to control the location of the second frequency band and the bandwidth; and
      control filter coefficients of the digital channel filter to control the bandwidth independently from the location of the second frequency band.

10. The receiver of claim 9, wherein the first frequency band comprises an RF band and the second frequency band comprises an IF band.

11. The receiver of claim 9, further comprising:
    another downconverter adapted to downconvert spectral content from the second frequency band to generate a baseband signal.

12. The receiver of claim 11, further comprising:
    an analog-to-digital converter to convert the IF signal to a digital signal,
    wherein the other downconverter comprises a decimator adapted to decimate the digital signal at a decimation rate based on the selected channel bandwidth, and the controller is adapted to inversely vary the location of the second frequency band based at least in part on the decimation rate.

13. The receiver of claim 12, wherein the controller is further adapted to control a clock frequency of the other downconverter based at least in part on the decimation rate.

14. An apparatus comprising:
    an integrated circuit comprising a downconverter, an interface, a filter and a controller, wherein
       the downconverter is adapted to process an intermediate frequency (IF) signal to downconvert spectral content in a first frequency band to a second frequency band to generate a baseband signal;
       the interface is adapted to be programmed to select a channel bandwidth for the filter;
       the controller is coupled to the interface to control a location of the first frequency band based at least in part on the selected channel bandwidth, the controller to:
          convert the IF signal to a digital IF signal;
          decimate the digital IF signal to provide a decimated digital IF signal;
          downconvert the decimated digital IF signal to provide a baseband signal;
          filter the baseband signal using a digital channel filter;
          control a location of the second frequency band based at least in part on the selected channel bandwidth, wherein the controller controls the rate of the decimation by controlling a decimation rate to control the location of the second frequency band and the bandwidth; and control filter coefficients of the digital channel filter to control the bandwidth independently from the location of the second frequency band.

15. The apparatus of claim 14, further comprising:

another downconverter adapted to downconvert spectral content in a radio frequency (RF) band of an RF signal to the first frequency band to generate the IF signal.

16. The apparatus of claim 14, further comprising:

an analog-to-digital converter to convert the IF signal to a digital signal; and a decimator adapted to decimate the digital signal at a decimation rate based on the selected channel bandwidth to generate the baseband signal, wherein the controller is further adapted to inversely vary the location of the first frequency band relative to the decimation rate.

17. The apparatus of claim 14, wherein the controller is adapted to control the location such that a change in the channel bandwidth produces a proportionate change in the location.

18. The apparatus of claim 16, wherein the controller is further adapted to control a clock frequency of the downconverter based at least in part on the decimation rate.

* * * * *